No. 763,270. PATENTED JUNE 21, 1904.
H. B. ELLSWORTH.
DEVICE FOR COOLING AND AERATING MILK.
APPLICATION FILED JAN. 16, 1904.
NO MODEL.
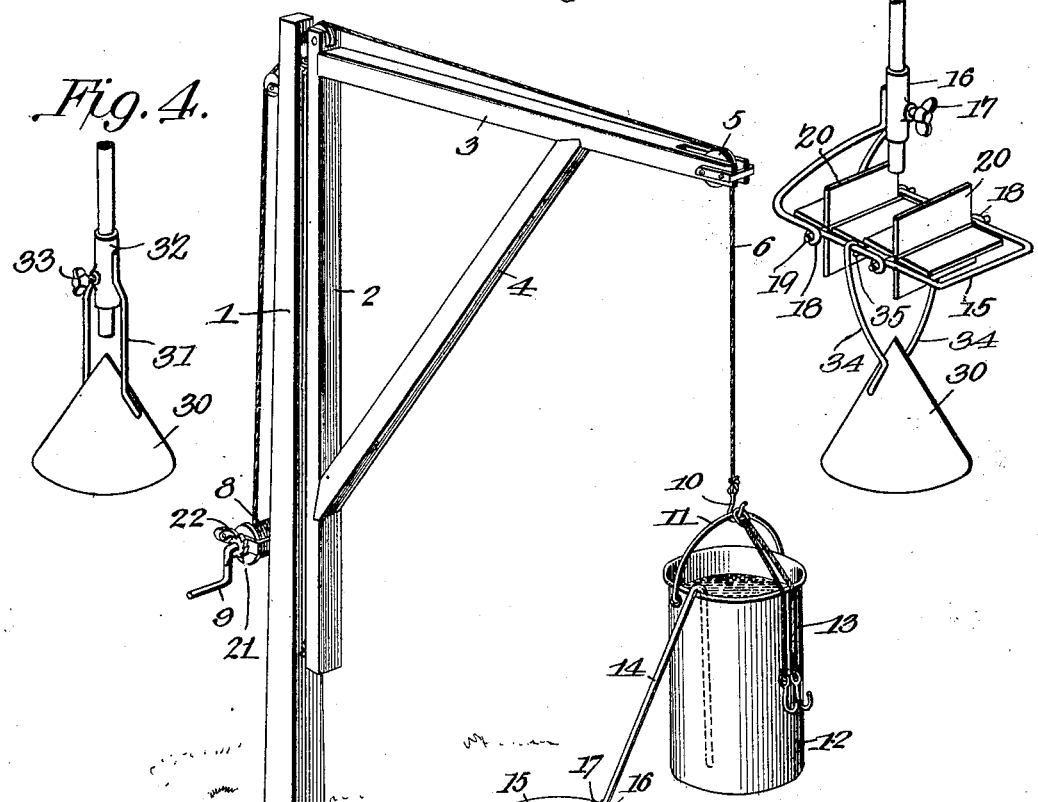
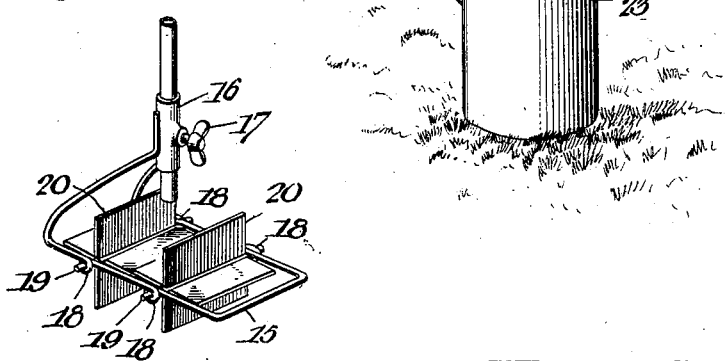
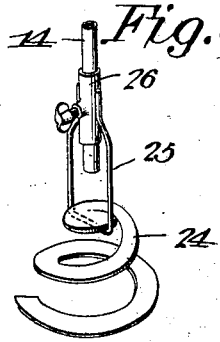
Witnesses
E. F. Stewart
Wm J. Bagger
Harry B. Ellsworth,
Inventor,
by C. A. Snow & Co.
Attorneys No. 763,270.                                              Patented June 21, 1904.

UNITED STATES PATENT OFFICE.

HARRY B. ELLSWORTH, OF EXCELSIOR, WISCONSIN.

DEVICE FOR COOLING AND AERATING MILK.

SPECIFICATION forming part of Letters Patent No. 763,270, dated June 21, 1904.

Application filed January 16, 1904. Serial No. 189,347. (No model.)

*To all whom it may concern:*

Be it known that I, HARRY B. ELLSWORTH, a citizen of the United States, residing at Excelsior, in the county of Richland and State of Wisconsin, have invented a new and useful Device for Cooling and Aerating Milk, of which the following is a specification.

This invention relates to devices for cooling and aerating milk; and it has for its object to provide a device of this class which shall be simple in construction and which may be easily manipulated, not only for the purposes indicated, but also for the purpose of handling milk-cans in loading and unloading the same at the creamery where the milk is delivered.

In the handling of milk at creameries it is extremely important that the milk should be quickly deprived of the animal heat, and it is equally important that the milk should be thoroughly aerated. To accomplish both of these purposes in a simple, convenient, and inexpensive manner is the principal object of my invention, which with these ends in view consists in the improved construction, arrangement, and combination of parts, which will be hereinafter fully described, and particularly pointed out in the claims.

In the accompanying drawings I have illustrated simple and preferred forms of my invention, it being understood, however, that I do not limit myself to the structural details therein exhibited, but reserve the right to any changes and modifications which may be resorted to within the scope of my invention and without departing from the spirit or sacrificing the utility of the same.

In said drawings, Figure 1 is a perspective view showing my improved milk cooling and aerating apparatus in operative position. Fig. 2 is a perspective view showing the siphon with one form of aerator attached thereto. Fig. 3 is a perspective view showing the siphon provided with an aerator attachment of different construction. Fig. 4 is a detail view illustrating another modification. Fig. 5 is a detail view showing the form of aerator illustrated in Fig. 2 in combination with an auxiliary aerator.

Corresponding parts in the several figures are indicated by similar numerals of reference.

In carrying out my invention I provide means whereby a can containing milk may be elevated and supported at a proper elevation to enable its contents to be removed through a siphon. In the drawings I have shown a post or upright 1, to which is swiveled a derrick consisting of an upright 2, a horizontal arm 3, and an inclined brace 4. At the outer end of the arm 3 is a pulley 5, over which passes a hoisting-rope or other flexible element 6, which is guided over the pulley, journaled in suitable bearings near the upper ends of the post 1, said rope or hoisting element being guided to a winding-drum 8, the shaft of which has a crank 9, whereby said drum may be rotated to wind the hoisting element thereon. The free end of the hoisting-rope has a hook 10, adapted to engage the bail 11 of a can or tank 12, or suitable means may be provided, such as a sling 13, by means of which the hoisting element may be connected with an ordinary milk-can.

14 designates a siphon, which is preferably made of some suitable non-corrodible metal, such as aluminium, or which may be plated with nickel or other suitable non-corrodible metal. Upon the long leg of this siphon is mounted an aerator which in the form illustrated in Fig. 2 of the drawings comprises a frame 15, made of wire or other suitable material and which has a sleeve 16, provided with a set-screw 17, whereby it may be secured in position upon the leg of the siphon. The frame 15 is provided with bearings 18 for a pair of shafts 19, each of which is provided with a plurality of radiating blades or paddles 20, which intersect each other, as will be clearly seen in Fig. 2 of the drawings. The parts are so arranged and assembled that the intersecting blades or paddles will be disposed a short distance below the discharge end of the leg of the siphon to which the aerator is attached.

In operation the tank, can, or other receptacle containing the new milk is connected with the hoisting apparatus and is elevated to the desired height by operating the winding-drum, a ratchet-wheel 21 and stop-pawl 22 being provided to prevent reverse movement of said winding-drum. The siphon is then placed in the said can and another can, 23, is placed beneath the discharge end of the siphon. When the flow is started through the latter, the milk escaping through the discharge end will impinge upon the intersecting blades or paddles, the shafts of which will thus be rotated in their bearings, so that the milk will be diffused or scattered, and thus exposed to the action of the atmosphere, thus thoroughly aerating the milk and at the same time reducing the temperature of the same as nearly as possible to that of the atmosphere. When the can or tank 12 is empty, it may be lowered and another one connected with the hoisting medium and elevated, and the operation may be proceeded with by simply changing the siphon from one can to another.

In Fig. 3 of the drawings I have illustrated a modified form of an aerator, which in this instance consists of a spiral coil 24, of sheet metal, which may be cut or stamped from a single sheet or plate of metal, the coils being separated, so as to form an approximately coniform spiral, the windings of which have flat upper surfaces. This coil being suspended below the discharge end of the siphon by means of a frame 25, connected with a sleeve 26, will obviously receive the milk discharged through the siphon and spread or diffuse the same, so that the particles will be thoroughly exposed to the action of the atmosphere.

In Fig. 4 has been illustrated still another form of aerator, which consists simply of a conical spreader 30, connected, by means of a rod or wire 31, with a sleeve 32, having a set-screw 33, whereby it may be mounted for operation upon the long leg of the siphon.

As will be seen from the foregoing, either form of aerator herein shown is extremely simple and is capable of being readily connected with or detached from the siphon, so that it may be easily and thoroughly cleansed. Other forms of aerators may be devised and used in connection with my invention.

In order to make the aeration still more complete, it may sometimes be found desirable to use two or more aerating devices in combination with each other. Thus I have in Fig. 5 of the drawings illustrated an aerating device of the construction shown in Fig. 2 and a conical spreader, as shown in Fig. 4, disposed below the same and connected with the frame 15 thereof by means of a pair of divergent wires 34, provided at their upper ends with hooks 35, by means of which the conical spreader 30 may be suspended from the frame 15. It is obvious that when this modification is resorted to the milk will be still more finely divided and the division will continue through a longer space of time, during which the milk is exposed to the cooling influences of the atmosphere, which also results in the oxidation of the unorganized ferments and the destruction of objectionable odors.

Cooling and aeration of milk has heretofore been accomplished by means of apparatus of a more or less complicated construction, and in most of the cooling apparatus water is employed for the purpose of reducing the temperature of the milk. This is objectionable, for the reason that in order to obtain the best results it is desirable that the air with which the milk comes in contact shall be as dry as possible. In the absence of complicated apparatus it has been customary to cool and to aerate the milk by dipping it out of the tank or container and permitting it to run slowly back into the same; but this process is laborious and also objectionable on account of the time consumed in carrying out said process. By my invention the milk may be conveniently handled, cooled, and aerated, no attention being required, except on exchanging the empty cans for full ones and in shifting the siphon from one can to another. It is also obvious that the hoisting apparatus used in connection with my invention will be found useful for the purpose of unloading and loading the wagons by which the milk is conveyed to the creamery.

Having thus described my invention, I claim—

1. In a milk cooling and aerating device, a siphon, a sleeve adapted to be detachably connected with said siphon, a frame carried by said sleeve, shafts journaled in said frame, and paddles radiating from said shafts, said paddles being adapted to receive the discharge from the siphon.

2. In a milk cooling and aerating device, a siphon, a sleeve connected detachably with said siphon, a frame carried by said sleeve, shafts journaled in said frame, and paddles extending radially from said shafts and intersecting each other to be rotated by the action of the discharge through the siphon.

3. In a milk cooling and aerating device, a hoisting apparatus including a derrick, guide-pulleys, a winding-drum and a flexible hoisting element, a container, a siphon in said container, a receiving vessel, and a spreading device connected detachably with the discharge-leg of the siphon and adapted to receive the discharge from the latter.

In testimony that I claim the foregoing as my own I have hereto affixed my signature in the presence of two witnesses.

HARRY B. ELLSWORTH.

Witnesses:
S. A. DAUGHERTY,
LAWRENCE DAWSOM.